United States Patent [19]
Quirk

[11] 3,751,004
[45] Aug. 7, 1973

[54] FLANGED BODY WITH FLANGE REINFORCING RIBS

[75] Inventor: Robert W. Quirk, Los Angeles, Calif.

[73] Assignee: Rheem Fluid Systems, Inc., Chatsworth, Calif.

[22] Filed: Dec. 17, 1971

[21] Appl. No.: 209,215

[52] U.S. Cl.............. 251/366, 156/173, 242/7.21
[51] Int. Cl............................................ F16k 27/00
[58] Field of Search................ 251/366, 367, 356, 251/368; 242/7.21, 7.19; 156/172, 173, 425, 446

[56] References Cited
UNITED STATES PATENTS

| | | | |
|---|---|---|---|
| 2,878,038 | 3/1959 | Noland | 156/172 X |
| 3,189,500 | 6/1965 | Escher | 156/173 X |
| 3,397,847 | 8/1968 | Thaden | 156/425 X |
| 3,484,317 | 12/1969 | Dickerson | 156/425 X |
| 3,552,665 | 1/1971 | Kelly | 242/7.21 |
| 3,673,029 | 6/1972 | McLarty | 156/172 X |
| 3,697,346 | 10/1972 | Van Dorn et al. | 156/172 X |
| 2,208,180 | 7/1940 | Delleani | 251/366 X |
| 2,337,841 | 12/1943 | Shafer | 251/324 X |
| 3,206,530 | 9/1965 | Botelet | 251/368 X |
| 3,395,890 | 8/1968 | Eckert et al. | 251/368 X |
| 2,903,236 | 9/1959 | Holycross et al. | 251/366 |
| 2,989,990 | 6/1961 | Bass et al. | 251/368 X |
| 3,383,089 | 5/1968 | Baxter | 251/366 |
| 3,638,908 | 2/1972 | Grove | 251/366 X |

FOREIGN PATENTS OR APPLICATIONS

| | | | |
|---|---|---|---|
| 59,242 | 12/1953 | France | 251/367 |
| 62,271 | 12/1948 | Netherlands | 251/367 |
| 843,485 | 7/1952 | Germany | 251/366 |

*Primary Examiner*—Samuel Scott
*Attorney*—Ford W. Harris, Jr., Walter Eugene Tinsley et al.

[57] ABSTRACT

A so-called filament wound article having an annular flange and a longitudinal rib buttressing the flange. The latter comprises one or more synthetic resin impregnated, helical windings of fiber glass roving, tape, or the like. Rib reinforcing elements of similar materials are embedded in and extend lengthwise of the rib and have ends interspersed with and entangled with the flange reinforcing windings. Thus, the reinforcing elements of the rib and the flange are mechanically interlocked for increased strength.

4 Claims, 8 Drawing Figures 3,751,004

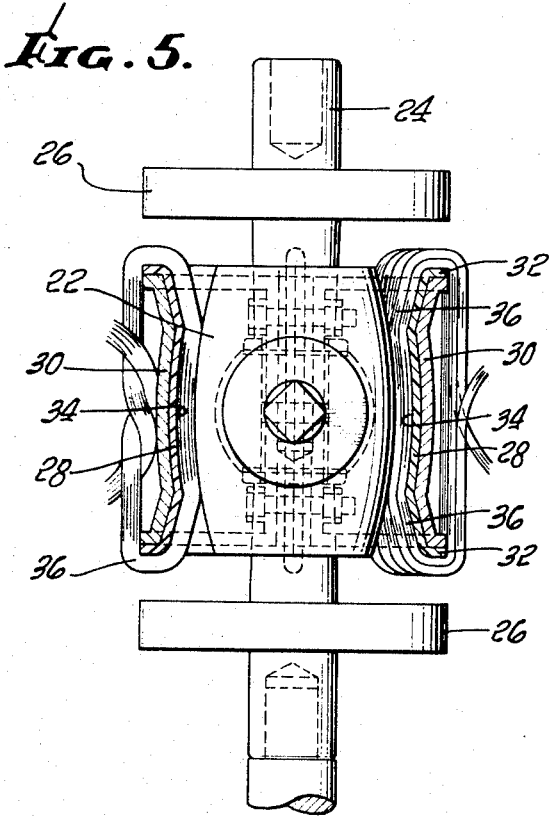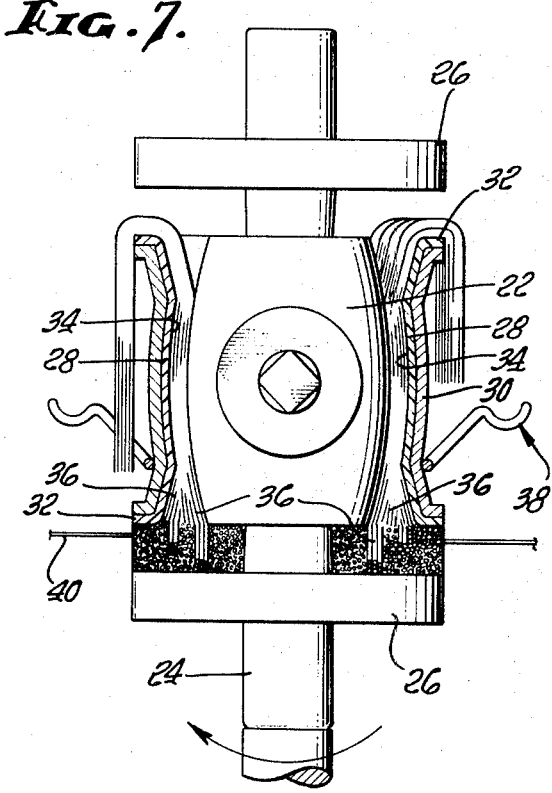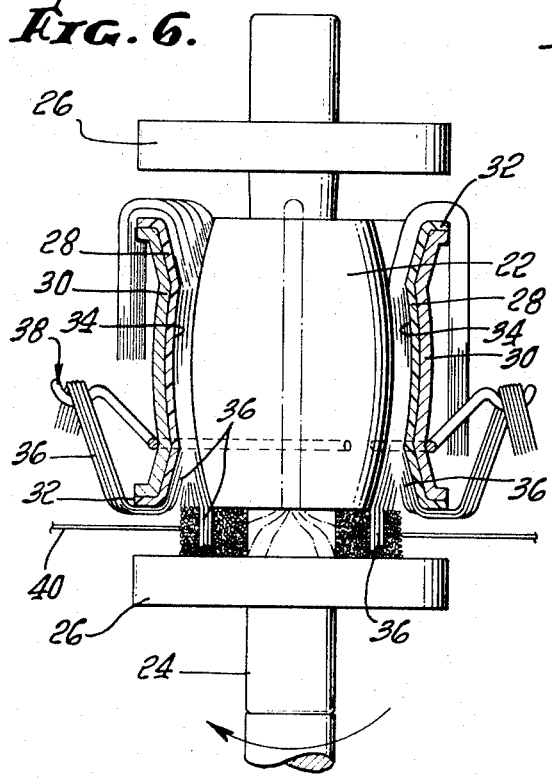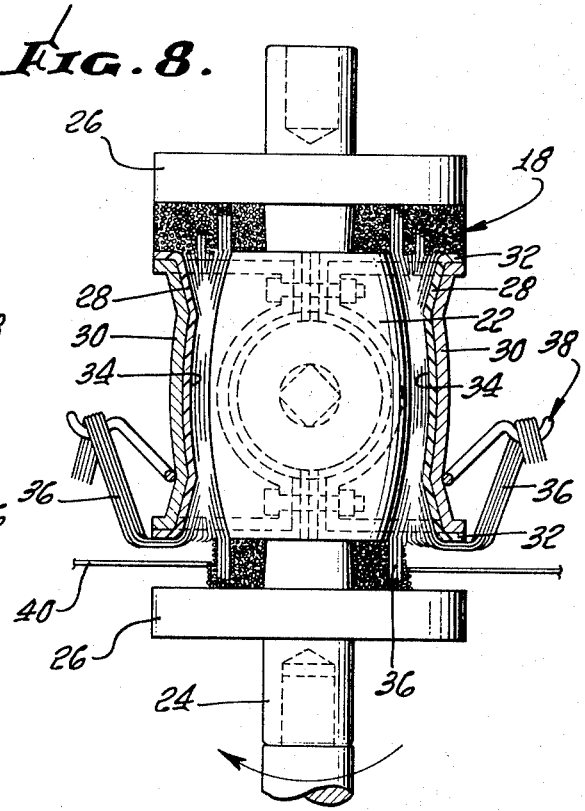

FLANGED BODY WITH FLANGE REINFORCING RIBS

BACKGROUND OF INVENTION

The present invention relates in general to so-called filament wound articles or products and, more particularly, to a flanged article of this character having flange reinforcing ribs buttressing the flange or flanges of the article.

More particularly, the invention relates to articles made of synthetic resin impregnated fibrous materials. Preferably such reinforcing materials as fiber glass roving, woven tape, and the like, are used, but the invention is not necessarily limited thereto.

For convenience, the invention will be considered herein in connection with a flanged valve body having longitudinal flange reinforcing ribs buttressing the flanges of the valve body. Again, however, it will be understood that the invention is not limited thereto and may be applied to any flanged body having one or more flange reinforcing ribs buttressing the flange or flanges of the body.

SUMMARY AND OBJECTS OF INVENTION

The primary object of the present invention is to provide a flanged article having a flange buttressing rib wherein the flange and the rib are reinforced by fibrous elements mechanically interlocked within the flange. More particularly, an important object of the invention is to provide an article of the foregoing general nature having flange reinforcing elements embedded in and extending lengthwise of the flange, and having rib reinforcing elements embedded in and extending lengthwise of the rib and having ends interspersed with the flange reinforcing elements. A related object is to provide an article of this character wherein the flange is annular and the flange reinforcing elements comprise convolutions of a helical winding or windings.

Yet another object is to provide a construction of the foregoing nature wherein the interspersed rib and flange reinforcing elements are synthetic resin impregnated to mechanically lock them together, thereby making the flange and the rib, in effect, an integral structure, which is an important feature.

Still another important object is to provide a method of making an article having an annular flange and a flange buttressing rib, including the steps of: positioning rib reinforcing elements longitudinally of a mandrel; winding a flange reinforcing element around the mandrel adjacent the rib reinforcing elements; and periodically interspersing ends of one or more of the rib reinforcing elements with the convolutions of the flange reinforcing winding.

The foregoing objects, advantages, features and results of the present invention, together with various other objects, advantages, features and results which will be evident to those skilled in the art in the light of this disclosure, may be achieved with the exemplary embodiment illustrated in the accompanying drawings and described in detail hereinafter.

DESCRIPTION OF DRAWINGS

In the drawings:

FIGS. 5 to 8 are views, partly in elevation and partly in section, illustrating successive steps in interlocking flange and rib reinforcing elements in accordance with the invention.

DETAILED DESCRIPTION OF EXEMPLARY EMBODIMENT OF INVENTION

Figure 1:
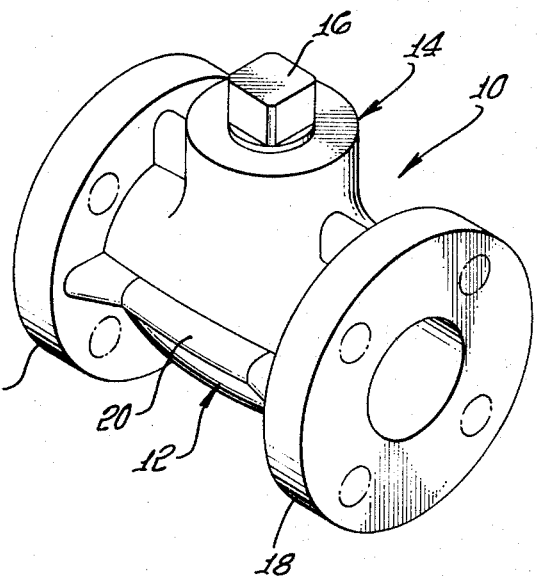
FIG. 1 is an isometric view of a ball valve having a body provided with annular flanges and flange buttressing ribs in accordance with the invention.
Figure 3:
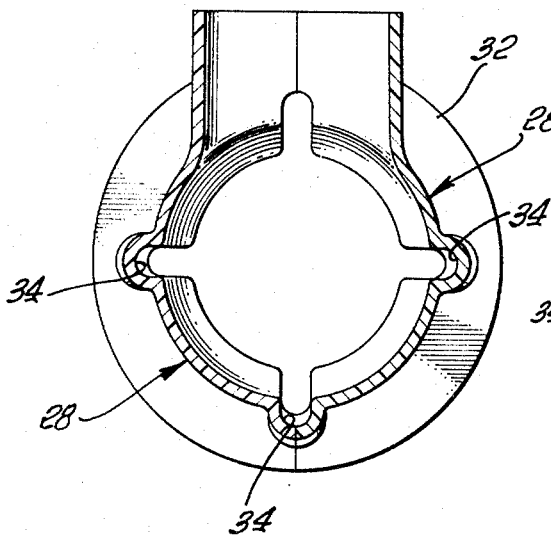
FIGS. 3 and 4 are transverse sectional views respectively taken along the arrowed lines 3—3 and 4—4 of FIG. 2.
Figure 4:
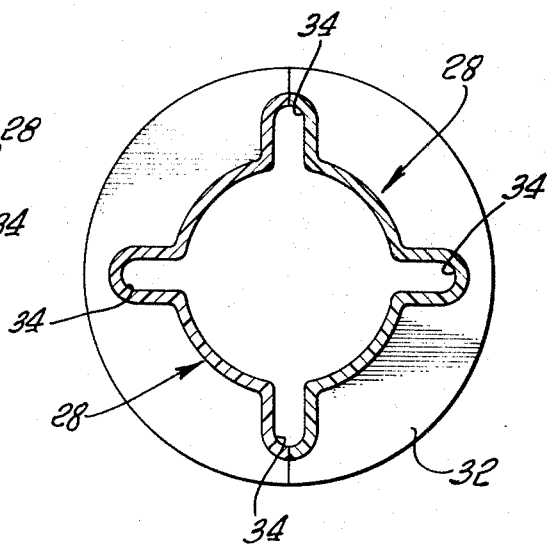

Referring initially to FIG. 1 of the drawings, illustrated therein is a ball valve 10 comprising a T-shaped valve body 12 provided intermediate its ends with a neck 14 having therein a rotatable stem 16 for actuating a valve ball, not shown, within the valve body. At the ends of the valve body 12 are annular flanges 18 by means of which the valve body 12 may be secured in a pipe line, or to other fittings. The flanges 18 are buttressed by longitudinal ribs 20 on the valve body 12.

As will be explained, the flanges 18 and the ribs 20 are reinforced by fibrous elements, such as fiber glass roving, tape, rope, or the like, impregnated by a suitable synthetic resin, the ends of the rib reinforcing elements being interspersed with and interlocked with the flange reinforcing elements. The latter are preferably applied by helically winding a fibrous reinforcing element or elements around a mandrel. The rib reinforcing elements may be applied in various ways, the one disclosed hereinafter being illustrative only.

Turning for the moment to FIGS. 5 to 8 of the drawings, illustrated therein is a hollow valve body core 22 which is adapted to receive the valve ball and the actuating stem 16 therein and which is of any suitable construction. For example, it may have been formed by a filament winding process.

The core 22 is mounted on a suitable removable mandrel 24 carrying winding limiting annular flanges 26 spaced from the respective ends of the core.

Figure 2:
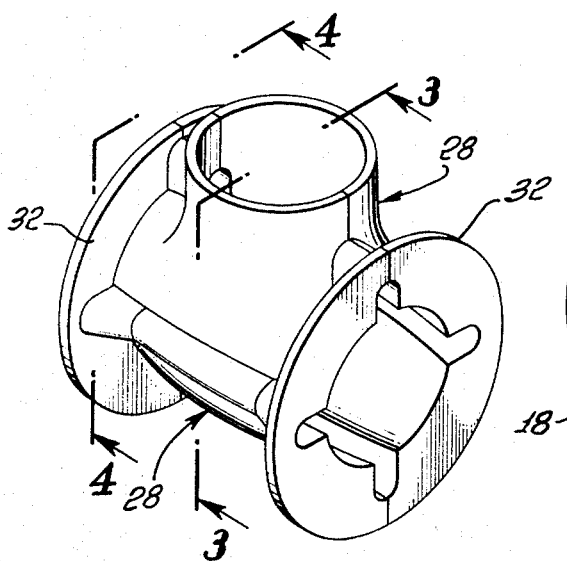
FIG. 2 is an isometric view of valve body forming shells utilized in the invention.

Bonded to the core 22 are two valve body half shells 28 which may be secured in place by a suitable split clamp 30. The shells 28, which are perhaps best shown in FIG 2, constitute the exterior of the valve body 12 and cooperate to provide at the ends of the valve body annular flanges 32. When the core 22 and the shells 28 are mounted on the mandrel 24, the annular flanges 32 are spaced axially inwardly from the respective winding limiting flanges 26. As will become apparent, the annular flanges 32 also serve winding limiting functions.

The two shells 38 are provided therein with circumferentially spaced, internal longitudinal channels 34. The outer surfaces of these channels constitute the outer surfaces of the flange buttressing ribs 20 of the final product 10.

As best shown in FIG. 5 of the drawings, molded into the channels 34, and extending longitudinally thereof, are rib reinforcing elements 36, which may comprise fiber glass rovings, woven tapes, or the like. The rib reinforcing elements 36 may be molded into the channels 34 with any suitable synthetic resin, and in any suitable manner. For example, the rib reinforcing elements 36 may be resin impregnated before placement in the channels 34, sufficient quantities of synthetic resin being utilized to insure that the rib reinforcing elements and the synthetic resin completely fill the channels.

The rib reinforcing elements 36 are substantially longer than the channels, as clearly shown in FIGS. 5 to 8. As shown on the left side of FIG. 5, the elements 36 may be separate elements the ends of which are tied together for convenience. Alternatively, as shown on the right side of FIG. 5, the rib reinforcing elements 36 may be formed by convolutions of a continuous multiconvolution loop of fibrous material. This loop can be cut to provide the individual rib reinforcing elements 36. As shown in FIGS. 6 to 8, a suitable holding means 38 for the lower ends of the rib reinforcing elements 36 may be mounted on the clamp 30.

The annular flanges 18 of the final product 10 are formed by circumferentially and/or helically winding resin impregnated flange reinforcing elements 40 on the mandrel 24 in the spaces between the winding limiting flanges 26 and the respective winding limiting flanges 32. This may be accomplished readily by rotating the mandrel 24 while feeding the resin impregnated flange reinforcing elements 40 thereonto in helical patterns.

As previously indicated, the present invention in effect structurally integrates the annular flanges 18 and the flange buttressing ribs 20 of the final product 10 by interspersing and mechanically interlocking the rib reinforcing elements 36 and the flange reinforcing elements 40. As will be clear from FIGS. 6 and 7, the lower ends of the rib reinforcing elements 36 are interspersed with the convolutions of the flange reinforcing elements 40 automatically, as the flange reinforcing elements 40 are wound, by releasing the lower ends of the rib reinforcing elements 36 one, or a few, at a time. As this is done, the released lower ends of the rib reinforcing elements 36 become interspersed with and entangled with the convolutions of the flange reinforcing elements 40 and are carried circumferentially around with the flange reinforcing elements. (As a matter of convenience, the ends of the rib reinforcing elements 36 are shown as interspersed with the flange reinforcing elements 40 in groups.) In actual practice, however, the rib reinforcing elements 36 will be interspersed with the flange reinforcing elements 40 singly, or in smaller groups, to achieve much more uniform interspersing, something which cannot readily be shown clearly in the drawings.

After one of the annular flanges 18 has been completed in the foregoing manner, as shown in FIG. 7, the partly finished valve 10 is inverted and the same process is repeated to form the other annular flange 18, as shown in FIG. 8. It will be understood that the rib reinforcing elements 36 in the channel 34 which extends longitudinally across the neck 14 of the valve 10 must be removed from the opening in the neck for the valve actuating stem 16.

As will be apparent, the method of the invention, and its resulting product, provide rib buttressed flanges which are structurally tied together in such a way as to form virtually integral units, thereby adding materially to the strength of the resulting product, which is an important feature of the invention.

Although an exemplary embodiment of the invention has been disclosed for purposes of illustration, it will be understood that various changes, modifications, and substitutions may be incorporated in such embodiment without departing from the spirit of the invention as defined by the claims appearing hereinafter.

I claim:

1. In an article having a flange and having a flange reinforcing rib buttressing said flange, the combination of:
   a. flange reinforcing elements comprising fibrous strands embedded in and extending lengthwise of said flange; and
   b. rib reinforcing elements comprising fibrous strands embedded in and extending lengthwise of said rib and having ends projecting beyond said rib and interspersed with said flange reinforcing strands.

2. An article as defined in claim 1 wherein said flange is annular and said flange reinforcing strands comprise convolutions of a helical winding.

3. In an article having spaced flanges with reinforcing ribs buttressing said flanges, the combination of:
   flange reinforcing elements in each of said flanges and comprising fibrous strands embedded in and extending lengthwise of the flange; and
   rib reinforcing elements for each of said ribs and comprising fibrous strands embedded in and extending lengthwise of the rib and having ends projecting beyond said rib and interspersed with the flange reinforcing strands of each of said flanges.

4. A method of making an article having an annular flange and a flange reinforcing rib buttressing said flange, including the steps of:
   a. positioning rib reinforcing elements longitudinally of a mandrel;
   b. winding a flange reinforcing element around the mandrel adjacent said rib reinforcing elements; and
   c. periodically interspersing ends of one or more of said rib reinforcing elements with the convolutions of said flange reinforcing element.

* * * * *